(12) United States Patent
Leinbach (10) Patent No.: US 12,179,828 B2
(45) Date of Patent: Dec. 31, 2024

(54) STROLLER ATTACHMENT

(71) Applicant: Be Excited LLC, Marina Del Rey, CA (US)

(72) Inventor: Brian Leinbach, Marina Del Rey, CA (US)

(73) Assignee: Be Excited LLC, Marina Del Rey, CA (US)

( * ) Notice: Subject to any disclaimer, the term of this patent is extended or adjusted under 35 U.S.C. 154(b) by 311 days.

(21) Appl. No.: 17/866,511

(22) Filed: Jul. 17, 2022

(65) Prior Publication Data
US 2023/0023661 A1    Jan. 26, 2023

Related U.S. Application Data

(60) Provisional application No. 63/225,816, filed on Jul. 26, 2021.

(51) Int. Cl.
*B62B 9/12*     (2006.01)
*B62B 9/26*     (2006.01)

(52) U.S. Cl.
CPC . *B62B 9/12* (2013.01); *B62B 9/26* (2013.01)

(58) Field of Classification Search
CPC .................................... B62B 9/12; B62B 9/26
USPC ....................................................... 280/642
See application file for complete search history.

(56) References Cited

U.S. PATENT DOCUMENTS

| | | | |
|---|---|---|---|
| 5,234,233 A * | 8/1993 | Fix | F16L 33/08 285/23 |
| 5,248,967 A * | 9/1993 | Daneshfar | G08G 1/097 340/661 |
| 5,388,321 A * | 2/1995 | Farrell | F16L 33/02 285/23 |
| 6,439,521 B1 * | 8/2002 | Wilson | B62B 9/00 248/228.7 |
| 7,520,539 B2 * | 4/2009 | Ignaczak | F01N 13/1872 285/410 |
| 8,448,977 B2 * | 5/2013 | Grintz | B62B 7/08 280/47.38 |
| 9,050,993 B2 * | 6/2015 | Pollack | B62B 7/08 |
| 9,216,755 B2 * | 12/2015 | Eisinger | B62B 5/065 |
| 9,273,814 B1 * | 3/2016 | De Los Santos | F16L 55/172 |
| 9,796,404 B2 * | 10/2017 | Xu | B62B 7/08 |
| 9,884,640 B2 * | 2/2018 | Li | B62B 7/08 |
| 9,902,417 B2 * | 2/2018 | Storm | B62B 7/083 |
| 10,239,550 B2 * | 3/2019 | Ruggiero | B62B 7/105 |
| 10,442,453 B2 * | 10/2019 | Haut | B62B 7/062 |
| 10,449,987 B2 * | 10/2019 | Gibson | B62B 7/06 |
| 11,110,951 B2 | 9/2021 | Gordon | |
| 2005/0246861 A1 | 11/2005 | Monrad | |
| 2010/0244393 A1 | 9/2010 | Thomas et al. | |
| 2015/0375766 A1 * | 12/2015 | Taylor | B62B 7/142 280/647 |
| 2016/0332655 A1 * | 11/2016 | Reaves | B62B 7/142 |

(Continued)

*Primary Examiner* — Hau V Phan
(74) *Attorney, Agent, or Firm* — Nolan Heimann LLP; Adam Diament (57) ABSTRACT

The invention generally related to an apparatus as an attachment for an object like a stroller. The apparatus includes an elongated rod configured to be coupled to a member of the object through a clamp. The apparatus further includes a means for articulating the rod for enabling the rod to engage at an upright orientation when not in use or a holding orientation when in use.

16 Claims, 6 Drawing Sheets

(56) References Cited

U.S. PATENT DOCUMENTS

2018/0178824 A1   6/2018   Hanson et al.
2019/0256122 A1*  8/2019   Eyman .................... B62B 9/102

* cited by examiner

STROLLER ATTACHMENT

CROSS-REFERENCE TO RELATED APPLICATIONS

This application claims benefit of U.S. Provisional Patent Application No. 63/225,816, filed on Jul. 26, 2021, entitled "Stroller Attachment," to Leinbach, the contents of which are incorporated by reference their entirety.

FIELD OF THE DISCLOSURE

The present invention relates to apparatus for objects like strollers, and more specifically, to attachments to help toddlers walk next to the strollers.

BACKGROUND OF THE INVENTION

Toddlers often do not want to sit in one place, but parents do not want to let their toddlers roam around. In particular, when parents take a toddler out in a stroller, the toddler often wants to walk around instead of being confined in a seated position within the stroller. In addition, it is often difficult to keep toddlers engaged if they are seated in a stroller.

While there have been some attempts to allow a toddler to walk along a stroller, there currently is a lack of convenient walking assistants that help guide these toddlers who are learning to walk in safe but somewhat free manner. Furthermore, safety of a toddler while walking around becomes a problem, as the toddler may trip over things near the stroller.

In U.S. Pat. No. 11,110,951, entitled "Convertible Walker and Stroller," there is provided a convertible walker and stroller as a single device. However, there are multiple limitations associated with such devices. The toddler is always confined to the device with restrained movement due to the structure of the assembly. Also, the walker-stroller device is bulky and needs to be carried everywhere by the Parent.

For these and other reasons, there remains a continuing need for improved devices that are portable and help toddlers walk with freedom and safety.

All patents, patent applications, and non-patent literature cited are hereby incorporated by reference in their entireties, for all purposes.

BRIEF SUMMARY OF THE PRESENT INVENTION

Accordingly, the present invention provides an apparatus having an elongated rod adapted to be pivotally coupled to a wheeled object; and a housing having a clamp for removable engagement with a member of the wheeled object wherein the clamp is configured to secure the elongated rod to the member, wherein the elongated rod is pivotably coupled to the housing, thereby allowing the elongated rod to be positioned in either an upright orientation or a holding orientation.

In an embodiment, the present invention provides the clamp having a securing means at a first end of the housing to lock the apparatus with a member of the wheeled object, a securing means insert positioned inside the housing at the first end for engaging the member between the securing means insert and at least one removeable insert positioned at a second end of the housing.

In another embodiment, the present invention provides an apparatus including an elongated rod adapted to be pivotally coupled to a wheeled object; and a housing having a clamp for removable engagement with a member of the wheeled object wherein the clamp is configured to secure the elongated rod to the member, wherein the clamp includes a securing means at a first end of the housing to lock the apparatus with a member of the wheeled object; and a securing means insert positioned inside the housing at the first end for engaging the member between the securing means insert and at least one removable insert positioned at a second end of the housing, wherein the elongated rod is pivotably coupled to the housing, thereby allowing the elongated rod to be positioned in either an upright orientation or a holding orientation.

In an advantageous aspect, the clamp and the holding orientation of the rod ensure a push force applied by a user along the elongated rod that moves the wheeled object is transferred to the wheeled object. The transfer of force ensures there is no tripping of the wheeled object.

In another aspect, the invention provides a wheeled object like a stroller having an apparatus configured for enabling a user to hold and walk while pushing the wheeled object. The wheeled object includes an elongated rod adapted to be pivotally coupled to the wheeled object; and a means configured to articulate the elongated rod through a gear and enable the rod to engage at a holding orientation, wherein the means to articulate the elongated rod includes a push button actuator for articulating the rod to engage at the holding orientation.

In one general aspect, the invention provides a stroller as a wheeled object with a removable apparatus having a clamp for engaging with a member of the stroller. The clamp includes one or more removable inserts and a securing means with one or more securing inserts configured to couple the apparatus with different types of strollers. Regardless of the type, shape, dimension including thickness of the stroller members, the removable apparatus of the invention is configured to couple to the stroller.

Another general aspect includes the wheeled object with a means to articulate an elongated rod of an apparatus, where the apparatus is removable attached to the wheeled object for enabling a user to walk along the wheeled object. The means enable the apparatus to be in an upright or a holding orientation.

In an advantageous aspect, the present invention provides an apparatus, that, once attached to the object like a stroller, has an articulating rod that allows the parent, easily fold back the rod alongside the stroller. This way the parent would not have to remove the apparatus when it is not being used. The rod that the child holds onto is curved on the outside. This helps to ensure that the child doesn't easily run off. The rod at its base allows it to fold along the side of the stroller.

In another advantageous aspect, once attached, the rod of the apparatus includes a curved end at its connection base that allows the parent to easily fold up the bar. This prevents it from sticking out and then it can run parallel to the stroller. The rod is configured to telescope to allow the parent to adjust the size and angle they would like the rod placed.

In yet another advantageous aspect, the apparatus of the invention is configured to be adapted to any type, size, shape or dimension object. Since, wheeled objects like Stoller are available with different weights and sizes, the apparatus is configured to be adapted to any such wheeled object and at the same time ensures transfer of push force on the rod by the user to the wheeled object. The transfer of force also prevents any tripping even if the weight of the wheeled object is less.

DETAILED DESCRIPTION OF EMBODIMENTS

The invention now will be described more fully hereinafter with reference to the accompanying images, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

In an exemplary embodiment, the present invention provides an apparatus configured to couple to a wheeled object for enabling a user to hold the apparatus and walk. The wheeled object includes a stroller, a trolley, a four wheeled suitcase or any other wheeled object to which the apparatus is adapted for pushing.

Figure 1:
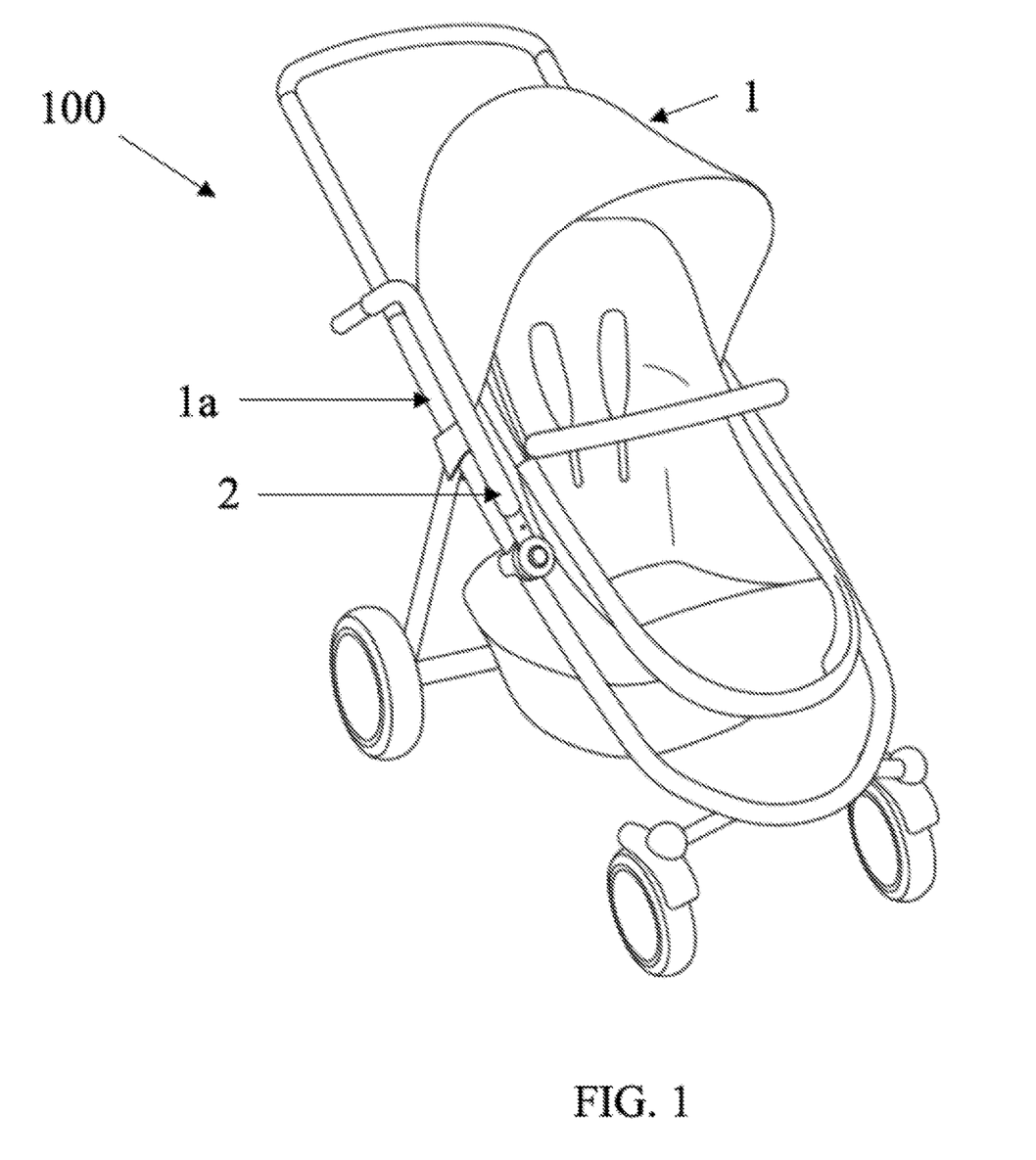
FIG. 1 is perspective view of a stroller as an object with an apparatus coupled to the stroller and in a close position in accordance with an embodiment of the invention.

Turning to the Figures, FIG. 1 shows perspective view 100 of a stroller (1) as a wheeled object and an apparatus (2) attached to a member 1a of the wheeled object in a holding orientation for enabling a toddler user to walk in accordance with an embodiment of the invention.

Figure 1A:
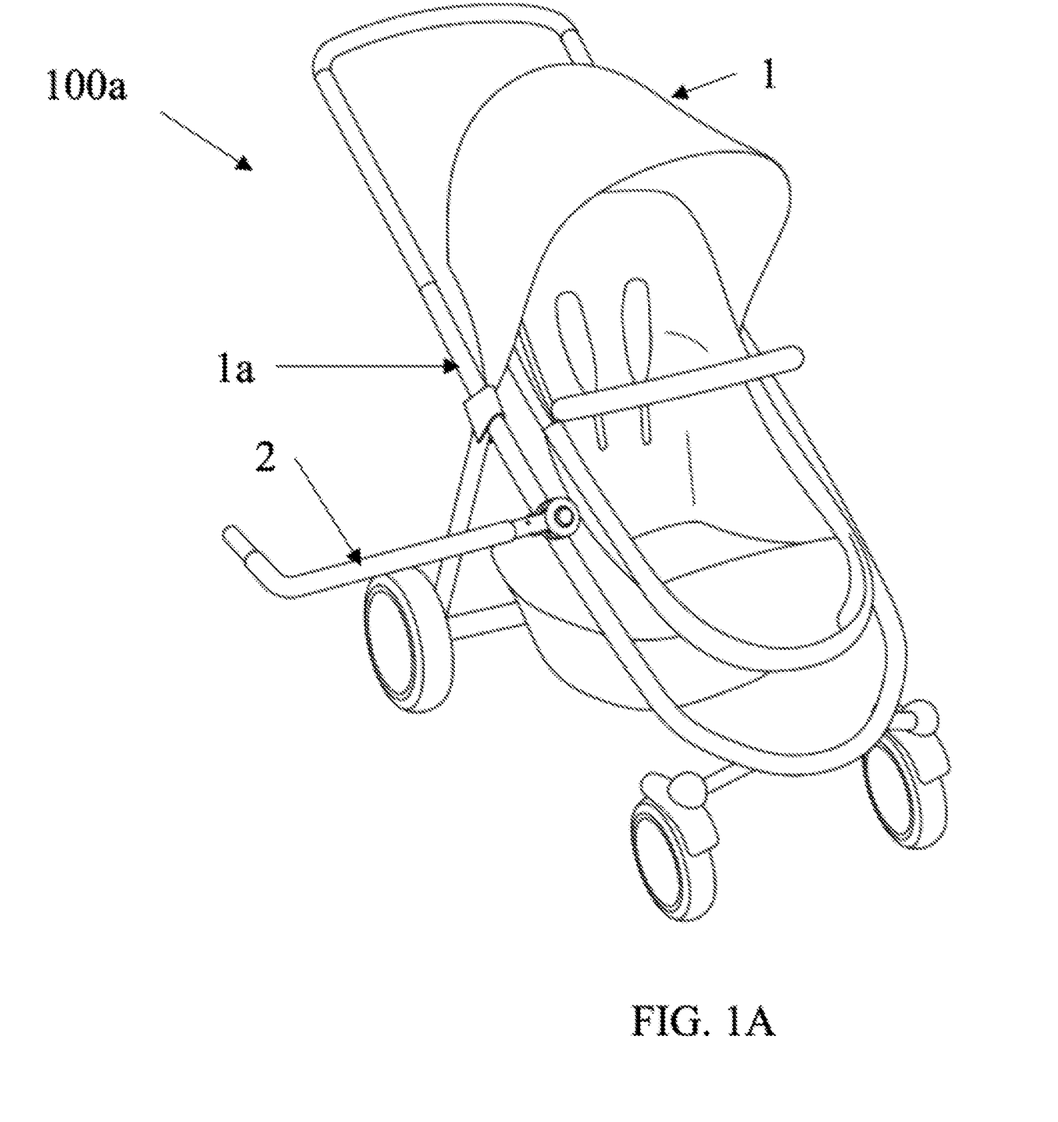
FIG. 1A is perspective view of the stroller as a wheeled object and the apparatus attached to the wheeled object in a holding orientation for enabling a toddler user to walk in accordance with an embodiment of the invention.

FIG. 1A shows perspective view 100a of the stroller (1) with the apparatus (2) in an upright orientation in accordance with an embodiment of the invention. The apparatus is configured to be parallel to the wheeled object member 1a thereby ensuring easy movement of the stroller (1) when not in use.

Figure 2:
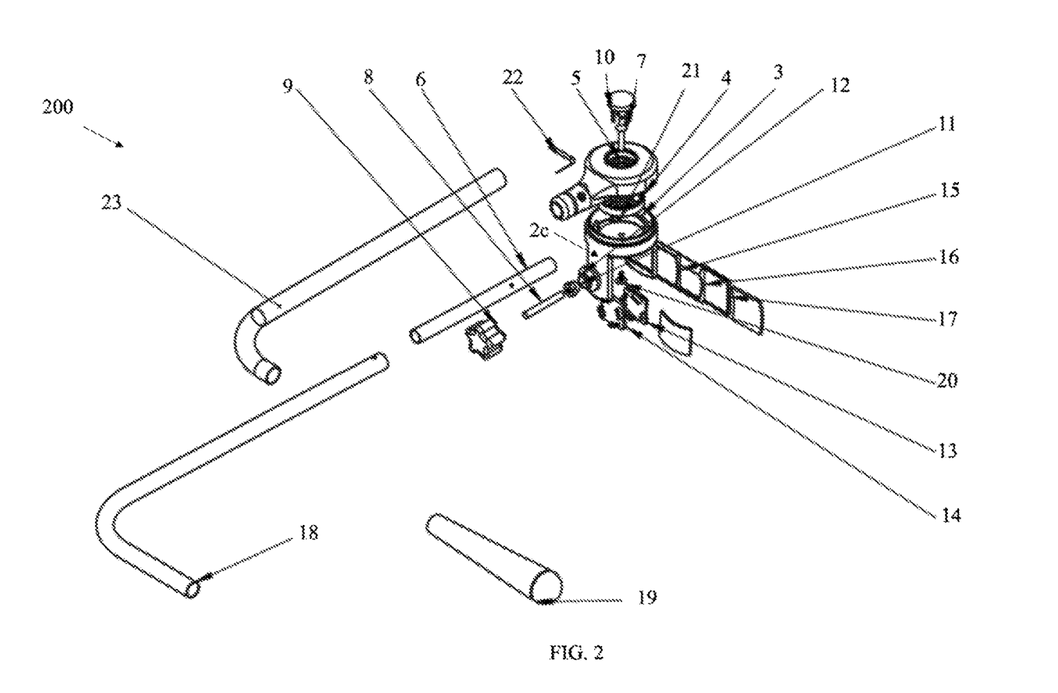
FIG. 2 is an exploded view of the apparatus in accordance with an embodiment of the invention.
Figure 2A:
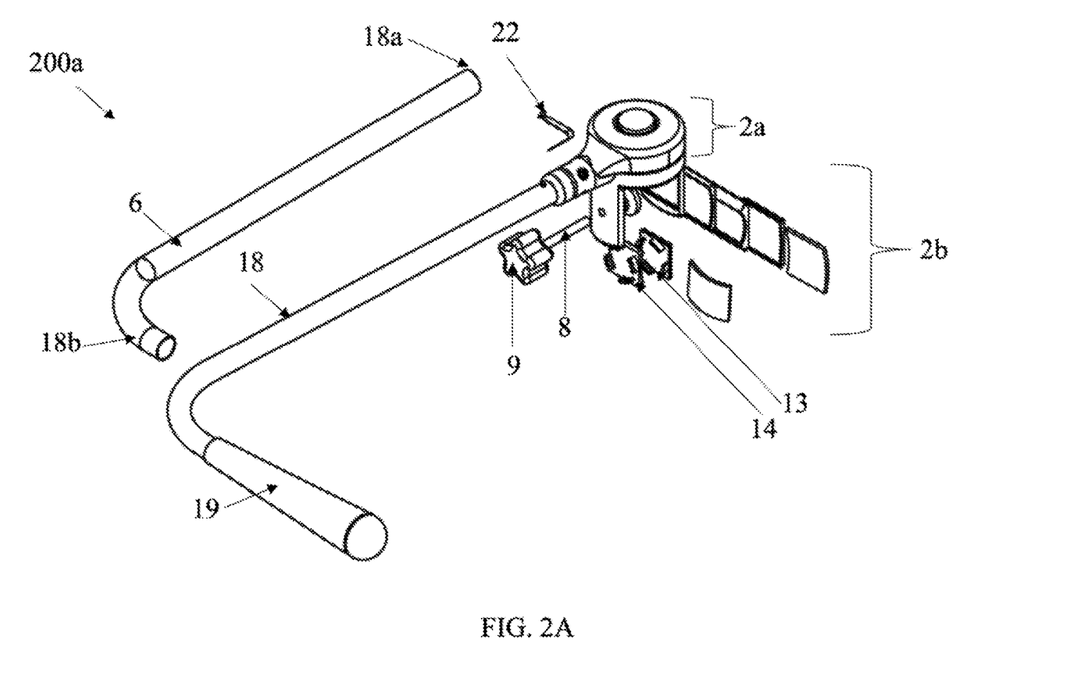
FIG. 2A is a perspective view of the apparatus in accordance with an embodiment of the invention.

FIGS. 2 and 2A depicts an exploded view (200) and a perspective view (200a) of the apparatus (2) in accordance with an example embodiment of the invention. The apparatus (2) includes a clamp/clamping mechanism (2a) for coupling the apparatus (2) to the handle member 1a through a screw (8) and ball joint mechanism having a ball joint (12) with a ball joint bolt (11). The apparatus (2) also includes an elongated rod (18) connected to a hub (2b) to articulate the rod (18). The clamp/clamping mechanism (2a) is part of a housing (2c) that enables the apparatus (2) to be tightly fixed to the handle member (1a) of the wheeled object/stroller by use of one or more interchangeable and removable inserts (15, 16, 17). The hub (2b) is coupled to the housing (2c) and configured to articulate the elongated rod (18) through a gear (4) mechanism and enables the rod (18) to engage at a holding orientation (FIG. 1A). The hub (2b) includes a push button actuator including a button (10) having a button bottom (3) and a button top (5) for triggering the movement of the gear (4) thereby enabling the rod (18) to actuate and move from upright orientation to holding orientation. The rod (18) includes a telescope (6) enabling extension or reduction of length of the rod (18) depending on the holding requirement of a user. The apparatus (2) includes a binding barrel (7) for connecting the button to the hub (2b) for articulation to move the rod (18).

It shall be apparent to a person skilled in the art, that while the clamp 2a of the apparatus 2 has been explained with a handle/knob (9), screw (8) and a ball joint mechanism as a securing means at a first end of the housing 2c to secure the handle member 1a to the apparatus 2, other similar mechanism may be used for securing the handle member (1a) between a securing means insert (13, 14) and the removable insert (15, 16, 17) within the scope of the present invention.

In an embodiment, the apparatus (2) includes a barrel screw 20 for engaging the housing with the hub (26) for articulation of the bar. The inner portion of the housing (2c) provides the clamp (2a) and the upper portion of the housing (2c) accommodates the hub (2b) for articulation.

In an embodiment, the elongated rod (18) includes the telescopic means/telescope (6) configured to slidably move inside the rod for adjusting length of the rod (18). The rod (18) is configured to be attached at different positions on the wheeled object depending on parameters including height of the user, weight of the user, and configuration of the handle member (1a). The bar-telescope arrangement (23) enables movement of the telescope (6) sideways as well as rotational movement inside the rod (18). Further, the rod (18) includes a first end (18a) and a second end (18b). The rod (18) at the second end (18b) accommodates an end cap (19) to ensure safety of the user. Also, the second end (18b) of the rod (18) is curved for protection of the user.

In an embodiment, the elongated rod (18) is configured to rotate and lock in at 0 degrees and 90 degrees thereby enabling the rod (18) to be folded against the handle member (1a) when in upright orientation or not in use, or the rod (18) is locked down horizontally to be in the holding orientation when in use.

In another embodiment, the elongated rod (18) includes a curvature to provide an additional place to hold onto, as it is L shaped or a loop around and a parallel portion.

Figure 3:
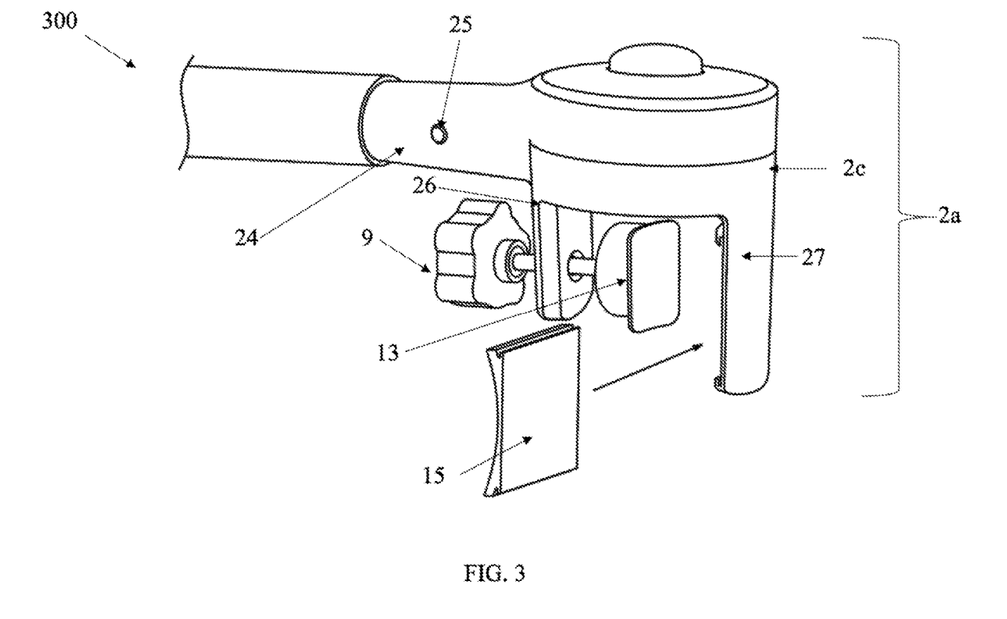
FIG. 3 is a clamp for attaching the apparatus to a member of the wheeled object in accordance with an embodiment of the invention.

FIG. 3 shows a perspective view 300 of the clamp (2a) for attaching the apparatus to the member of the wheeled object in accordance with an embodiment of the invention.

Referring to FIG. 2 and FIG. 3, the clamp 2a includes the securing means insert as the at least one ball joint insert (13, 14) inside the housing (2c) coupled to the ball joint (12) and configured for engaging the member between the ball joint insert (13, 14) and the at least one removable insert (15, 16, 17).

In an example embodiment, the clamp (2a) includes the handle/knob (9) for moving the screw (8) inside the ball joint (12) towards the at least one ball joint insert (13, 14) to engage the member with the apparatus by pushing against the at least one removable insert (15, 16, 17).

The clamp (2a) includes one or more foam pad adhered to the ball joint insert (13, 14) and the removable insert (15, 16, 17) to ensure a tight clamping of the apparatus to the handle member (1a).

In an exemplary embodiment, the elongated rod (18) is connected to the apparatus (2) at a nozzle (24) protruding out of the housing (2c). The connection includes a pin and hole connection (25) enabling the rod to rotate with respect to the axis of the nozzle (24).

Figure 4:
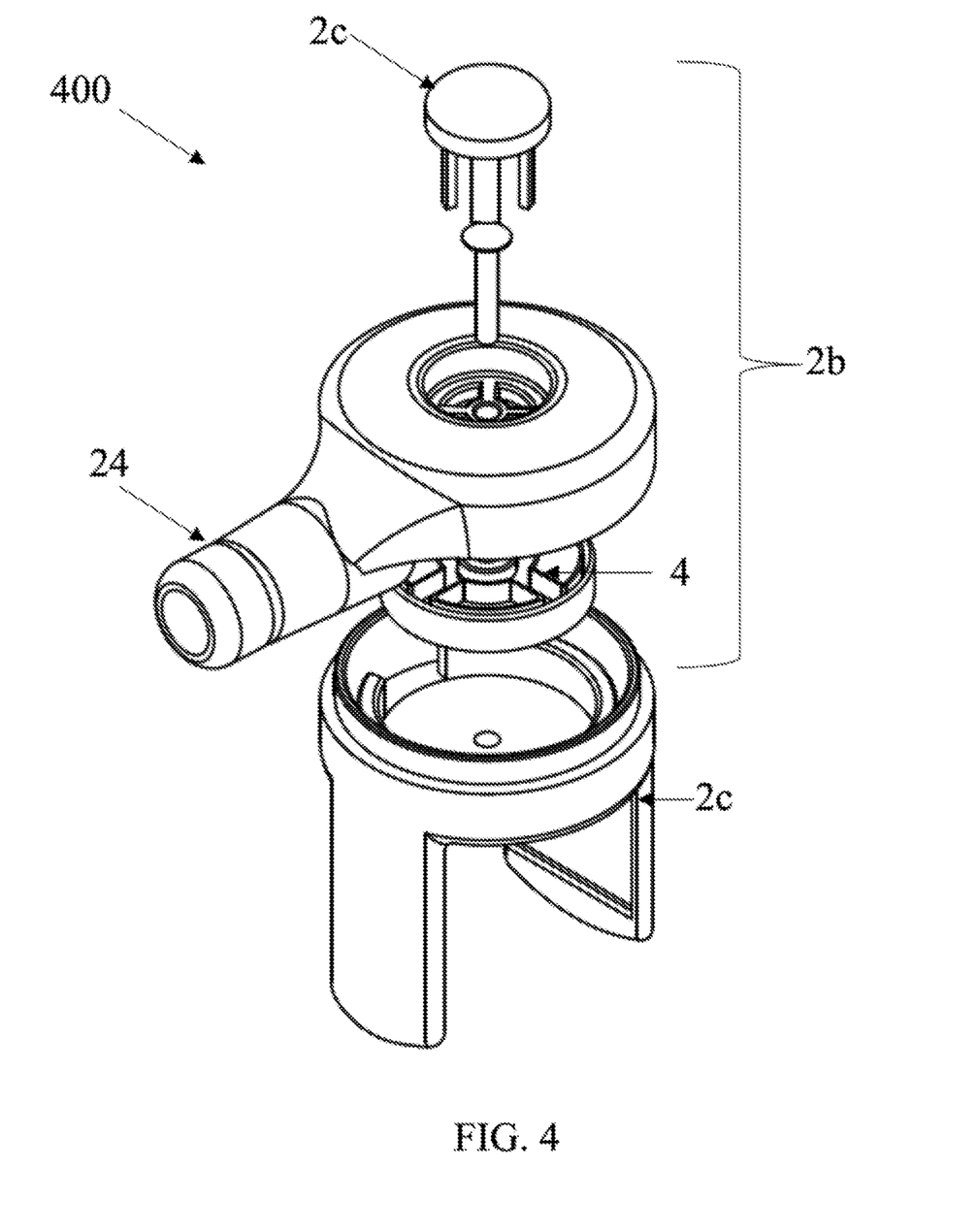
FIG. 4 is a means for articulating an elongated rod of the apparatus enabling the rod to be in holding orientation or upright orientation.

FIG. 4 shows a perspective view 400 of the hub (2b) for articulating an elongated rod of the apparatus (2) enabling the rod (18) to be in holding orientation or upright orientation.

Referring to FIG. 2 and FIG. 4, the hub (2b) to articulate the elongated rod (18) includes the push button actuator having the push button (10) connected to the barrel (7) that triggers the geared mechanism/gear (4) for articulating the rod (18) to engage at the holding orientation.

In an embodiment, the hub (2b) includes the spring (21) connected to the gear mechanism/gear (4) for enabling the rod (18) to move to the holding orientation. The hub (2b) also includes the spring button (22) for triggering the spring (21) to engage the rod (18) for moving. The rod (18) is configured to rotate or move sideways to increase the length for accommodating requirement of the user.

In an example embodiment, the apparatus connects to the stroller with a C-Clamp locking mechanism. The parent will place the C-Clamp over the rod on the stroller where it they would like it placed. Once the C-clamp is over the bar. Once in place, the parent will turn the knob on the Clamp to tighten the bolt with footing that is attached to the knob. The knob will be turned until the apparatus is securely held on tight. Other connection means that accomplish the same results as a C-Clamp locking mechanism and knob may also be used.

Variations of the type, form, size, and material of any element of the apparatus may be of any of those described previously and used in any of the method described.

REFERENCE NUMBERS

The following reference numbers are used throughout FIGS. 1-4
- 100 perspective view of a Stoller with an apparatus at an upright orientation or not in use position
- 100a perspective view of a Stoller with an apparatus at a holding orientation or in use position
- 200 exploded view of an apparatus for enabling a user to hold and walk
- 300 perspective view of a clamp of the apparatus attached to the stroller
- 400 perspective view of a means to articulate an elongated rod of the apparatus to move between the upright orientation and the holding orientation
- 1 wheeled object/stroller
- 1a wheeled object member/stroller member/handle member
- 2 apparatus attached to the wheeled object member/stroller member
- 2a clamp of the apparatus
- 2b hub to articulate the elongated rod of the apparatus
- 2c housing
- 3 button bottom
- 4 Gear
- 5 button top
- 6 telescope
- 7 Binding barrel
- 8 Handle screw
- 9 Handle/knob
- 10 Button
- 11 Ball joint bolt
- 12 Ball Joint
- 13 securing means insert/Ball Joint insert 1
- 14 securing means insert/Ball Joint insert 2
- 15 removable insert/conic insert 1
- 16 removable insert/conic insert 2
- 17 removable insert/conic insert 3
- 18 elongated bar
- 18a first end of elongated bar
- 18b second end of elongated bar
- 19 End Cap
- 20 Barrel Screw 21 Spring
22 Spring Button
23 bar-telescope arrangement
24 nozzle
25 pin-hole connection
26 first end of housing 2c
27 second end of housing 2c While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. An apparatus, comprising:
   an elongated rod adapted to be pivotally coupled to a handle member of a wheeled object; and
   a mounted to the elongated rod, wherein the clamp is configured to secure the elongated rod to the handle member, wherein the clamp comprises a hub and a housing, wherein the hub comprises an actuator operatively connecting a gear, wherein the housing comprises ball joint inserts and removable inserts, wherein the ball joint inserts and the removable inserts are inserted in the housing to engage and secure the handle member within the clamp,
   wherein the elongated rod extends horizontally from the handle member in a holding orientation allowing a user to push the elongated rod in order to push the wheeled object via the handle member, wherein the actuator is engaged allowing the gear to disengage the clamp with the handle member to allow the elongated rod to be positioned in an upright orientation from the holding orientation, and
   wherein the elongated rod positions adjacent to the handle member in the upright orientation, when not in use.

2. The apparatus of claim 1, wherein the clamp further comprises:
   a handle screw inside the housing for engaging the handle member between the ball joint inserts and the removable inserts.

3. The apparatus of claim 2, wherein the elongated rod has a telescopic configuration for adjusting length of the elongated rod.

4. The apparatus of claim 3, wherein the actuator connects to a barrel for triggering the gear for articulating the elongated rod to engage at the holding orientation.

5. The apparatus of claim 4, further comprises a spring connected to the gear for enabling the elongated rod to move from the holding orientation to the upright orientation.

6. The apparatus of claim 5, wherein the elongated rod is configured to be attached at different positions on the wheeled object depending on parameters including height of a user, weight of a user, and configuration of the handle member.

7. The apparatus of claim 2, wherein the clamp further comprises: knob, for moving the handle screw to engage the handle member with the apparatus by pushing the ball joint inserts against the removable inserts.

8. The apparatus of claim 1, wherein the wheeled object includes one of a stroller, a trolley, and a four wheeled suitcase to which the apparatus is adapted for pushing.

9. The apparatus of claim 1, further comprises one or more foam-pad pads adhered to the at least one removable insert inserts to ensure a tight clamping of the apparatus to the handle member of the wheeled object.

10. The apparatus of claim 1, wherein the elongated rod is configured to rotate and lock in at 0 degrees and 90 degrees thereby enabling the elongated rod to be folded against the handle member of the wheeled object when in the upright orientation when not in use, or the elongated rod is locked down horizontally to be in the holding orientation when in use.

11. The apparatus of claim 10, wherein the elongated rod includes a curvature to provide an additional place to hold onto, as it is L shaped or a loop around and a parallel portion.

12. A wheeled object comprising:
    a handle member;
    an elongated rod adapted to be pivotally coupled to the handle member; and
    a clamp mounted to the elongated rod, wherein the clamp is configured to secure the elongated rod to the handle member, wherein the clamp comprises a hub and a housing, wherein the hub is configured to articulate the elongated rod to enable the elongated rod to engage at a holding orientation and an upright orientation, wherein the hub comprises an actuator operatively connecting a gear, wherein the elongated rod extends horizontally from the handle member in the holding orientation allowing a user to push the elongated rod in order to push the wheeled object via the handle member, and wherein the actuator is engaged for articulating the elongated rod to engage at the holding orientation and position to the upright orientation with respect to the handle member.

13. The wheeled object of claim 12, wherein the wheeled object includes one of a stroller, a trolley, and a four wheeled suitcase to which the wheeled object is adapted for pushing.

14. The wheeled object of claim 13, further comprises a spring connected to the gear for enabling the elongated rod to rotate or move from the holding orientation to the upright orientation.

15. The wheeled object of claim 14, wherein the elongated rod is configured to be attached at different positions on the wheeled object depending on parameters, including height of a user, weight of the user, or configuration of the handle member on the wheeled object.

16. The wheeled object of claim 15, wherein the actuator connects to a barrel that triggers the gear.

* * * * *